US012614805B2

(12) United States Patent
    Shen

(10) Patent No.: US 12,614,805 B2
(45) Date of Patent: Apr. 28, 2026

(54) BATTERY AND ELECTRICAL APPARATUS

(71) Applicant: CONTEMPORARY AMPEREX TECHNOLOGY (HONG KONG) LIMITED, Hong Kong (CN)

(72) Inventor: Sheng Shen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 433 days.

(21) Appl. No.: 18/467,416

(22) Filed: Sep. 14, 2023

(65) Prior Publication Data

US 2024/0006702 A1 Jan. 4, 2024

Related U.S. Application Data

(63) Continuation of application No. PCT/CN2022/097480, filed on Jun. 7, 2022.

(30) Foreign Application Priority Data

Jan. 5, 2022 (CN) .......................... 202220018611.9

(51) Int. Cl.
    *H01M 50/262* (2021.01)
    *F16B 5/02* (2006.01)
    *H01M 50/209* (2021.01)
    *H01M 50/258* (2021.01)

(52) U.S. Cl.
    CPC ............ *H01M 50/262* (2021.01); *F16B 5/02* (2013.01); *H01M 50/209* (2021.01); *H01M 50/258* (2021.01); *H01M 2220/20* (2013.01)

(58) Field of Classification Search
    CPC ............. H01M 50/262; H01M 50/209; H01M 50/258; H01M 2220/20
    See application file for complete search history.

(56) References Cited

U.S. PATENT DOCUMENTS

| 2019/0296294 A1 | 9/2019 | Hirschbeck et al. |
| 2019/0372069 A1 | 12/2019 | Lee et al. |
| 2021/0288298 A1 | 9/2021 | Ramadan et al. |

FOREIGN PATENT DOCUMENTS

| CN | 207818670 U | 9/2018 |
| CN | 208889749 U | 5/2019 |
| CN | 209641715 U | 11/2019 |

(Continued)

OTHER PUBLICATIONS

The European Patent Office (EPO) The Extended European Search Report for Application No. 22918121.9 Sep. 3, 2024 59 Pages.

(Continued)

*Primary Examiner* — Jane J Rhee

(74) *Attorney, Agent, or Firm* — ANOVA LAW GROUP, PLLC

(57) ABSTRACT

A battery includes a plurality of battery modules arranged in sequence in a first direction. Each battery module includes battery cells and side plates arranged on both sides of the battery cells in the first direction, and the side plates of two adjacent battery modules are connected to each other. In the two connected side plates, one side plate is provided with a clamping protrusion, and the other side plate has a clamping groove, and the clamping protrusion is clamped in the clamping groove to prevent relative movement between the two connected side plates in a second direction. The second direction is perpendicular to the first direction.

9 Claims, 10 Drawing Sheets

(56)     References Cited

FOREIGN PATENT DOCUMENTS

| | | | |
|---|---|---|---|
| CN | 211719654 | U | 10/2020 |
| CN | 213584000 | U | 6/2021 |
| JP | 2017076504 | A | 4/2017 |

OTHER PUBLICATIONS

The World Intellectual Property Organization (WIPO) International Search Report for PCT/CN2022/097480 Sep. 20, 2022 7 pages (including English translation).

1000

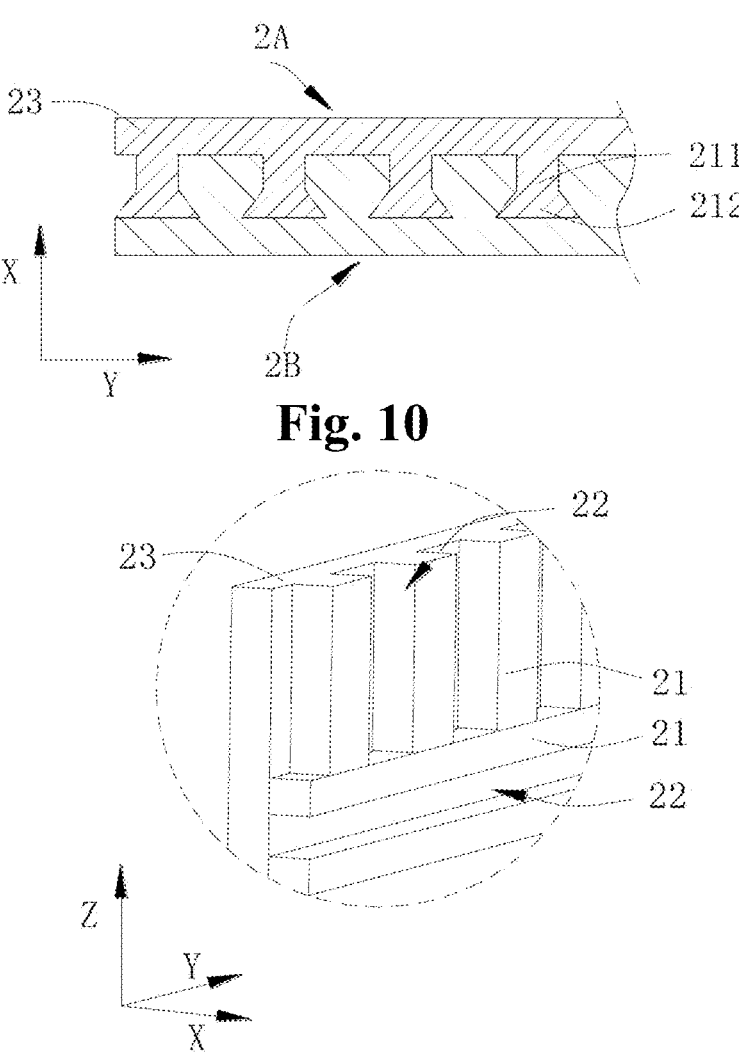
Fig. 10
Fig. 11
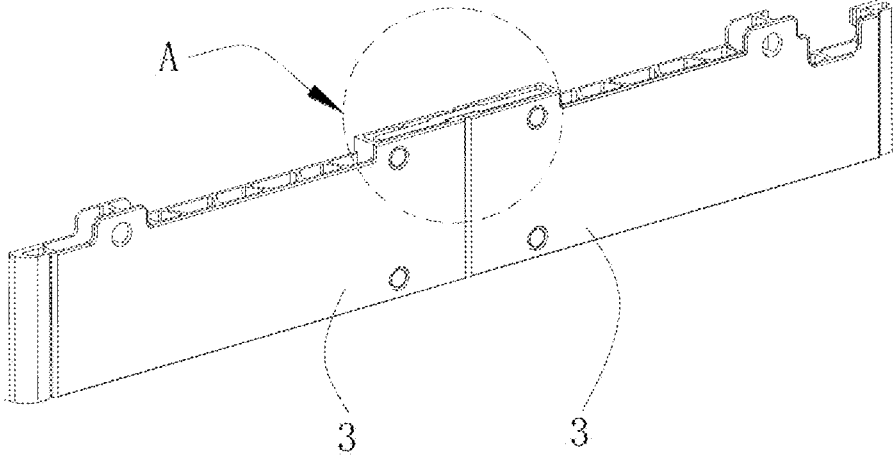
Fig. 12

B

BATTERY AND ELECTRICAL APPARATUS

CROSS-REFERENCE TO RELATED APPLICATIONS

The present application is a continuation of International Application No. PCT/CN2022/097480, filed on Jun. 7, 2022, which claims priority to Chinese Patent Application No. 202220018611.9 filed on Jan. 5, 2022 and entitled "BATTERY AND ELECTRICAL APPARATUS," which are incorporated herein by reference in their entirety.

TECHNICAL FIELD

The present application relates to the field of energy storage device technologies, and in particular, to a battery and an electrical apparatus.

BACKGROUND ART

In order to increase the battery capacity, usually a plurality of battery cells are stacked on each other to form a battery module, and the plurality of battery modules are then stacked on each other. However, under the action of expansion forces of battery cells, it is easy to cause the failure of the connection between adjacent battery modules, and the battery modules with failed connections are prone to displacement under the action of an external force, resulting in potential safety hazards.

To sum up, there is a need to design a battery to solve the above technical problems.

SUMMARY

Embodiments of the present application provide a battery and an electrical apparatus, and by arranging clamping protrusions and clamping grooves that are connected by clamping on side plates, displacement between adjacent battery modules is limited, and the safety performance of a battery is improved.

In a first aspect, the present application provides a battery, the battery includes a plurality of battery modules arranged in sequence in a first direction; each battery module includes battery cells and side plates arranged on both sides of the battery cells in the first direction; the side plates of two adjacent battery modules are connected to each other. In the two connected side plates, one side plate is provided with the clamping protrusions, and the other side plate has the clamping grooves, and the clamping protrusions are clamped into the clamping grooves to prevent each other from moving in a second direction, the second direction being perpendicular to the first direction.

In the above solution, by arranging the clamping grooves and the clamping protrusions on the side plates, the adjacent battery modules can be clamped and connected through the clamping protrusions and the clamping grooves on the side plates, and the clamping protrusions and the clamping grooves that are clamped and connected limit the movement of the adjacent battery modules in the second direction. Compared with the connection method of welding or bonding, even the side plates in this embodiment is deformed under the action of an expansion force of the battery cells, the clamping protrusions and the clamping grooves that are clamped and connected can also ensure the connection of the adjacent battery modules, thereby preventing relative displacement of the battery modules after they are separated, and improving the safety of the battery.

In some embodiments, the side plates connected to each other are provided with a plurality of clamping protrusions, and clamping grooves are defined between the clamping protrusions arranged on the side plates. A side plate is provided with clamping protrusions and clamping grooves at the same time, and a plurality of clamping protrusions are provided to increase a contact area between the connected side plates and improve the stability of the connection of the adjacent battery modules.

In some embodiments, in a plane where the side plate is located, the plurality of clamping protrusions of the side plate extend at least in two different directions. The clamping protrusions extending in different directions can limit the movement of the adjacent battery modules in different directions, thereby ensuring that the battery modules will not be displaced in a plurality of directions.

In some embodiments, the battery further includes an adhesive glue arranged between two adjacent battery modules, and the side plates of the two adjacent battery modules are bonded by the adhesive glue, so that the side plates not only realize clamping connection by the clamping protrusions and the clamping grooves, but also realize bonding through the adhesive glue, so as to improve the stability of the connection between the adjacent battery modules.

In some embodiments, the plurality of battery cells of the battery module are arranged side by side in a third direction, and the battery module further includes end plates arranged oppositely in the third direction, and the end plates and side plates are connected end-to-end and arranged around the plurality of battery cells. The battery also includes connecting elements, opposite ends of each connecting element are respectively connected to the end plates of two adjacent battery modules, so as to limit relative displacement of the adjacent end plates, and the first direction is perpendicular to the third direction.

In the above solution, the adjacent battery modules are not only clamped and connected through the clamping protrusions and clamping grooves provided on the side plates, but also limit the relative displacement of adjacent end plates through the connecting elements, thereby improving the stability of the connection between the adjacent battery modules.

In some embodiments, for the connecting element and the end plate connected, one is provided with a connecting protrusion, and the other is provided with a connecting groove matching with the connecting protrusion. The connecting element and the end plate are clamped and connected by the connecting protrusion and the connecting groove, which facilitates assembly of the connecting element and the end plate.

In some embodiments, the end plate has a connecting groove, the connecting element includes a first connecting portion and connecting protrusions connected to opposite sides of the first connecting portion, the connecting protrusions are inserted into the connecting grooves, and the end plates are connected to the connecting protrusions by bolts. The end plate and the connecting element not only realize the clamping connection through the connecting groove and the connecting protrusion, but also perform the bolt connection through the connecting protrusion, thereby improving the connection strength between the end plate and the connecting element.

In some embodiments, the end plate includes a first side wall and a second side wall that are arranged oppositely at an interval in the third direction, the connecting groove is formed between the first side wall and the second side wall, and the connecting protrusion abuts against the first side wall and the second side wall. The connecting protrusion abuts against the first side wall, which facilitates the bolts screwed in to secure the connecting protrusion and the first side wall.

In some embodiments, the end plate further includes a limiting protrusion protruding from the first side wall to the second side wall, and the first connecting portion has a limiting groove fitting the limiting protrusion. Not only the clamping connection between the end plate and the connecting element is realized through the connecting groove and the connecting protrusion, but also relative position limiting is realized through the limiting protrusion and the limiting groove.

In some embodiments, the connecting element includes a second connecting portion and a first fixing portion connected to opposite sides of the second connecting portion, the second connecting portion has a connecting groove, connecting protrusions of adjacent end plates are inserted into the connecting grooves, the two first fixing portions are arranged opposite to the connecting protrusions of the adjacent end plates in the third direction, and the first fixing portions are connected to the connecting protrusions by bolts. On the one hand, the end plate and the connecting element are clamped and connected through the connecting protrusion and the connecting groove, and on the other hand, the first fixing portion and the connecting protrusion are connected by bolts, so as to improve the stability of the connection between the end plate and the connecting element.

In some embodiments, the connecting element includes a first connecting plate, second connecting plates bent and extended from opposite ends of the first connecting plate, and second fixing portions bent and extended from the second connecting plates. The first connecting plate and the two second connecting plates form the connecting groove, the connecting protrusions of two adjacent end plates are clamped in the connecting groove together, and the second fixing portions are connected to the end plates by bolts. On the one hand, the end plate and the connecting element are clamped and connected through the connecting protrusion and the connecting groove, and on the other hand, through the bolt connection of the second fixing portions, the stability of the connection between the end plate and the connecting element is improved.

In some embodiments, the connecting element includes a first sub-element and a second sub-element, the first sub-element includes a bending portion and two penetrating portions arranged oppositely. The end plate has a receiving groove communicated in a fourth direction, the two penetrating portions are connected to the bending portion at one end, and respectively pass through the receiving grooves of the adjacent end plates and are connected to the second sub-element by bolts at the other end. The fourth direction is perpendicular to the third direction. The first sub-element can limit the movement of the two end plates in the third direction, and the bending portion and the second sub-element can limit the movement between the end plates and the connecting element. The penetrating portions pass through the receiving groove arranged in the fourth direction, and the end plates do not need to be provided with installation holes arranged in the third direction, so that the end plates have higher strength.

In some embodiments, the end plate further includes a receiving cavity in communication with the receiving groove, the bending portion is received in the receiving cavity, and an end of the bending portion close to the second sub-element abuts against a wall surface of the receiving cavity. The receiving cavity is arranged to receive the bending portion, so as to prevent the bending portion from interfering with arrangement of other components in the battery, and improve the compactness of the layout of the battery.

In a second aspect, the present application provides an electrical apparatus, including the battery in any embodiment in the first aspect, the battery being configured to provide electric energy.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

In order to illustrate the technical solutions of the embodiments of the present application more clearly, accompanying drawings required in the embodiments of the present application are briefly described below. Obviously, the accompanying drawings described below are only some embodiments of the present application. For those of ordinary skill in the art, other accompanying drawings can also be obtained according to the accompanying drawings without any creative efforts.

FIG. 10 is a schematic planar structural diagram of a side plate according to yet other embodiments of the present application;

FIG. 11 is a schematic partial three-dimensional structural diagram of a side plate according to yet other embodiments of the present application;

FIG. 12 is a schematic three-dimensional structural diagram of an end plate and a connecting element according to some embodiments of the present application;

5

Figure 14:
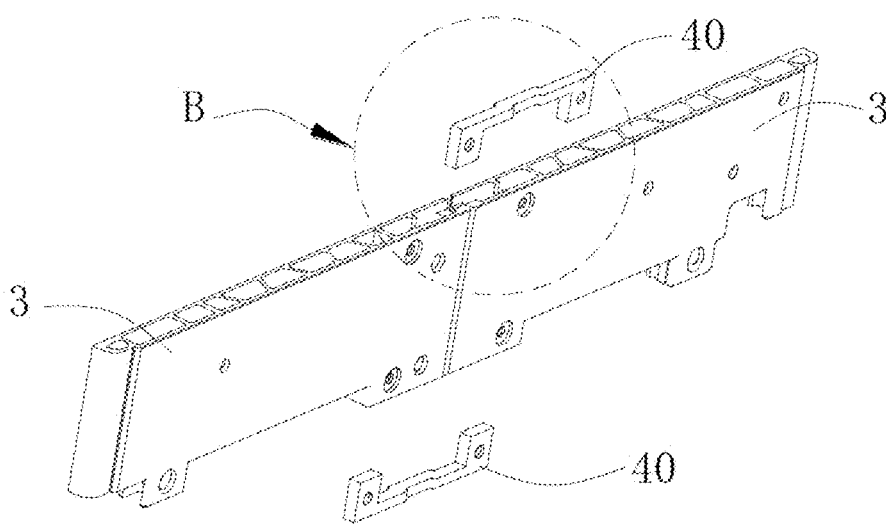
Figure 15:
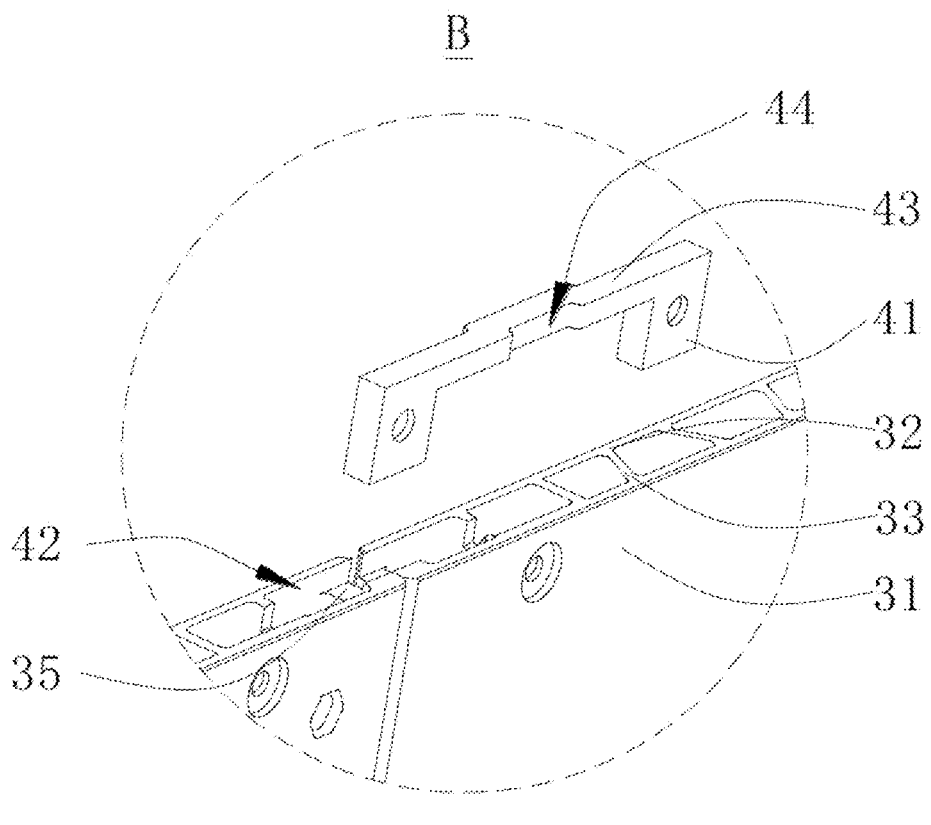
Figure 16:
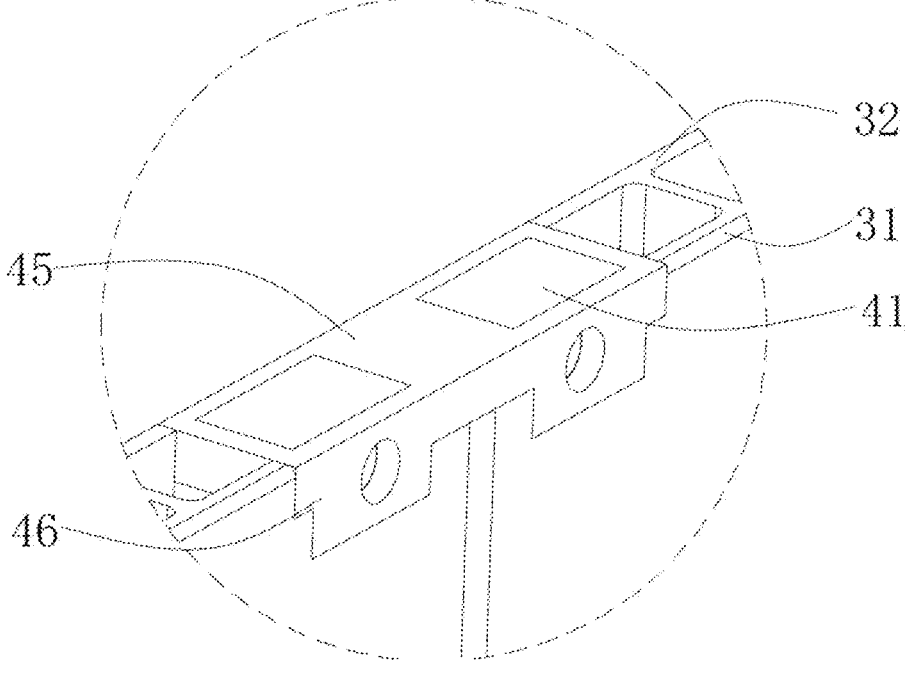
Figure 17:
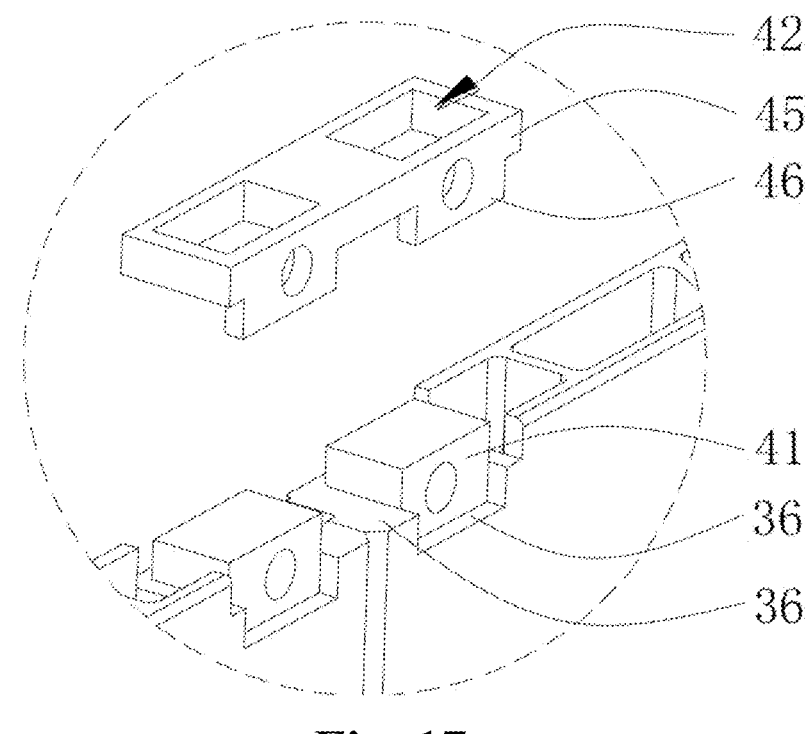
Figure 18:
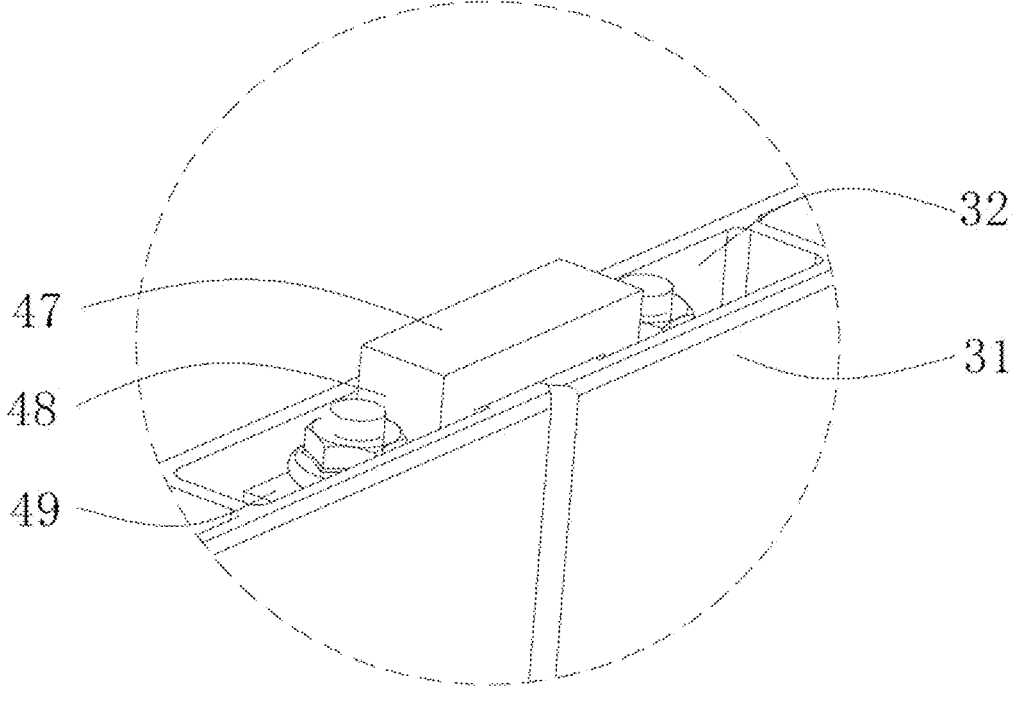
Figure 19:
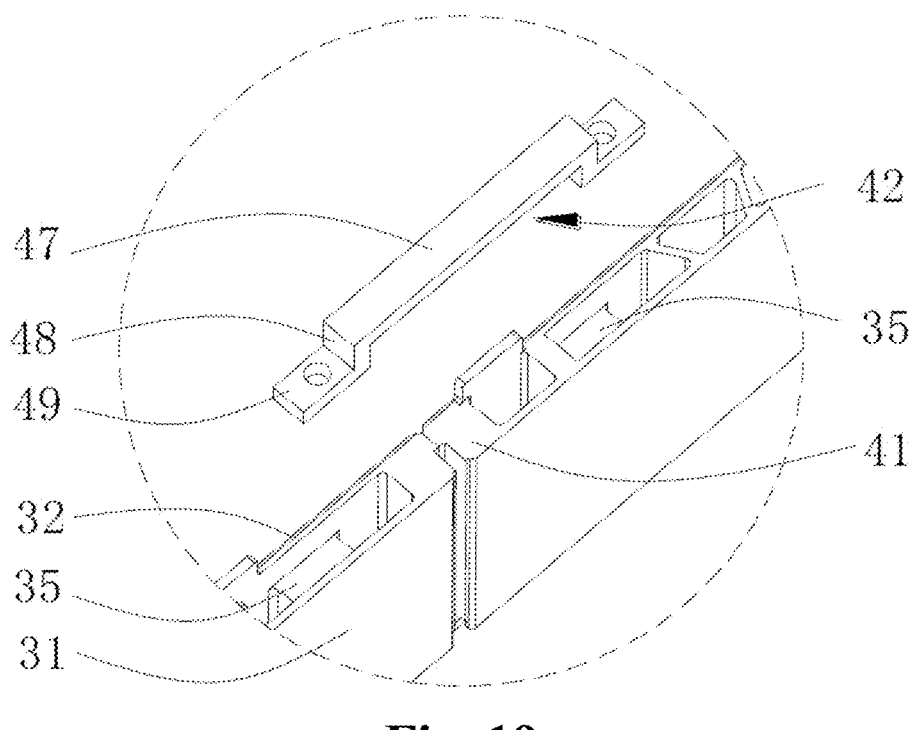
Figure 20:
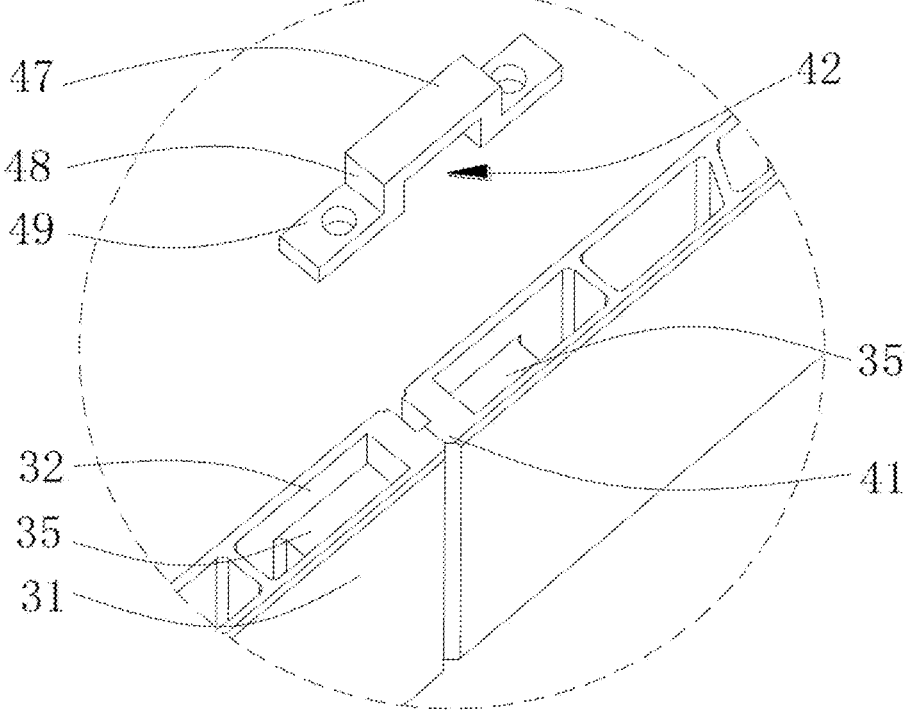
Figure 21:
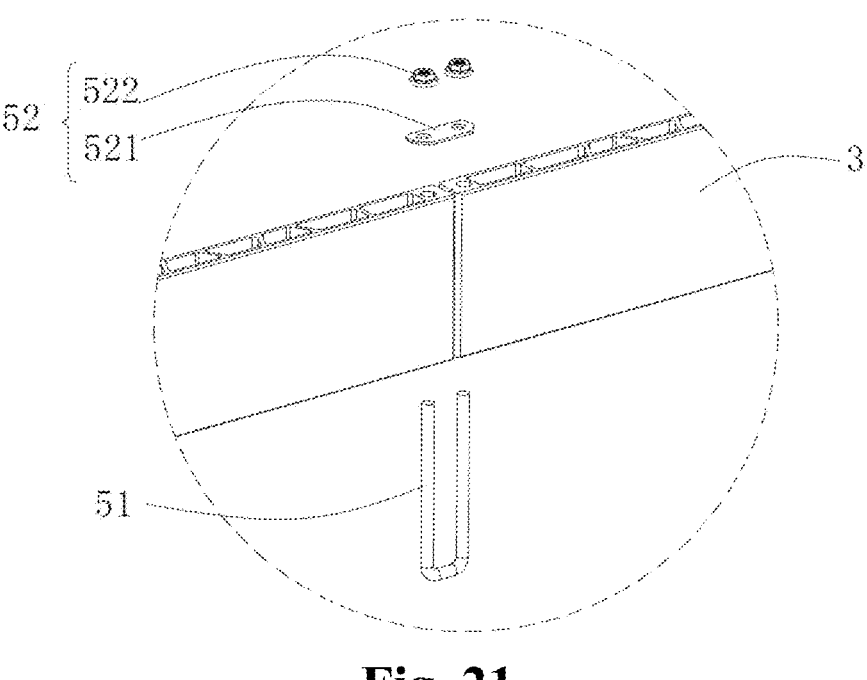
Figure 22:
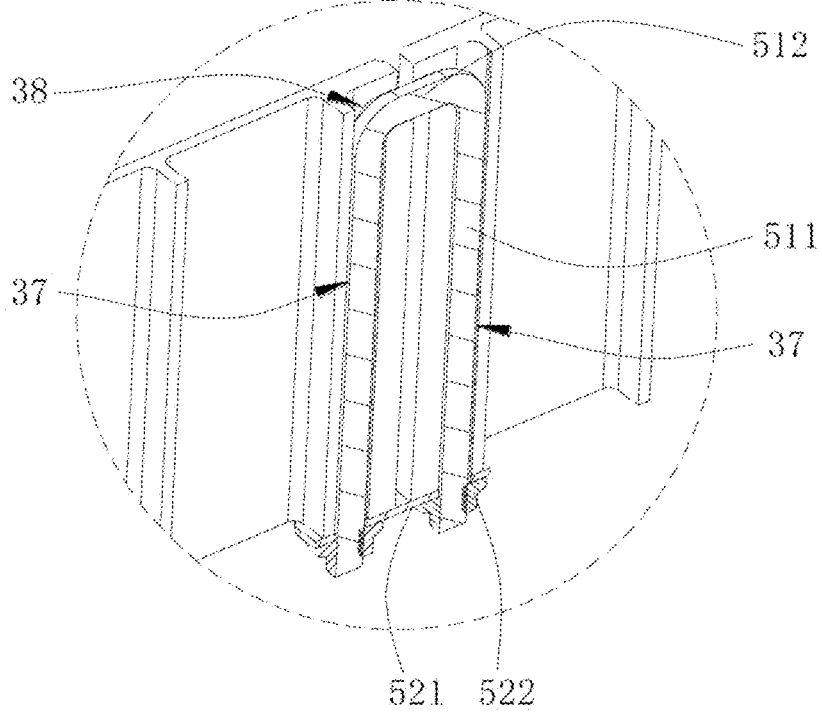

FIG. 14 is a schematic disassembled structural diagram an end plate and a connecting element according to some embodiments of the present application;

FIG. 15 is a schematic enlarged structural diagram of a part B shown in FIG. 14;

FIG. 16 is a schematic partial assembled structural diagram of an end plate and a connecting element according to some embodiments of the present application;

FIG. 17 is a schematic partial disassembled structural diagram of an end plate and a connecting element according to some embodiments of the present application;

FIG. 18 is a schematic partial assembled structural diagram of an end plate and a connecting element according to other embodiments of the present application;

FIG. 19 is a schematic partial disassembled structural diagram of an end plate and a connecting element according to other embodiments of the present application;

FIG. 20 is a schematic partial disassembled structural diagram of an end plate and a connecting element according to yet other embodiments of the present application;

FIG. 21 is a schematic partial assembled structural diagram of an end plate and a connecting element according to yet other embodiments of the present application; and FIG. 22 is a schematic partial disassembled structural diagram of an end plate and a connecting element according to yet other embodiments of the present application.

REFERENCE NUMERALS ARE AS FOLLOWS

Vehicle 1000; Battery 100; Controller 200; Motor 300; Battery module 10; Upper cover 20; Lower cover 30; Battery cell 1; End cover 11; Electrode terminal 11*a*; Shell 12; First side 121; Second side 122; Electrode assembly 13; Side plate 2; Clamping protrusion 21; Extending portion 211; Cover body portion 212; Clamping groove 22; Main body part 23; Connecting component 24; End plate 3; First side wall 31; Second side wall 32; Supporting rib 33; Limiting protrusion 34; Mounting plate 35; Supporting step 36; Receiving groove 37; Receiving cavity 38;

Connecting element 40; Connecting protrusion 41; Connecting groove 42; First connecting portion 43; Limiting groove 44; Second connecting portion 45; First fixing portion 46; First connecting plate 47; Second connecting plate 48; Second fixing portion 49; First sub-element 51; Bending portion 511; Penetrating portion 512; Second sub-element 52; Connecting piece 521; Fastener 522.

DETAILED DESCRIPTION

The implementations of the present application are further described in detail below with reference to the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper," "lower," "left," "right," "inner," and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first," "second," and "third" are used for descriptive purposes only, and cannot be construed as indicating or implying relative importance. "Perpendicular" is not strictly perpendicular, but within an allowable range of error. "Parallel" is not strictly parallel, but within an allowable range of error.

Reference herein to an "embodiment" in the present application means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

The orientation words appearing in the following description are the directions shown in the drawings, and do not limit the specific structure of the present application. In the description of the present application, it should be noted that the terms "mounting," "connecting," and "connection" should be understood in a broad sense, unless otherwise explicitly specified or defined. For example, it may be a fixed connection, a detachable connection, or an integrated connection; and it may be a direct connection or an indirect connection through an intermediate medium. For those of ordinary skill in the art, the specific meanings of the above terms in the present application may be understood according to specific circumstances.

In the present application, the battery cell may include a lithium ion secondary battery cell, a lithium ion primary battery cell, a lithium sulfur battery cell, a sodium/lithium ion battery cell, a sodium ion battery cell or a magnesium ion battery cell and so on, which will not be limited in the embodiments of the present application. The battery cell may be cylindrical, flat, rectangular, or in other shapes, which is also not limited in the embodiments of the present application. The battery cells are generally divided into three types according to encapsulating manners: cylindrical battery cells, rectangular square battery cells, and pouch cells, which are not limited in the embodiments of the present application.

The battery mentioned in the embodiments of the present application refers to a single physical module comprising one or more battery cells to provide a higher voltage and capacity. For example, the battery mentioned in the present application may include a battery module, a battery pack, or the like. The battery generally includes a box body for encapsulating one or a plurality of battery cells. The box body can prevent liquids or other foreign matters from affecting the charging or discharging of the battery cells.

The battery cell includes an electrode assembly and an electrolyte solution, the electrode assembly being composed of a positive electrode sheet, a negative electrode sheet, and a separator. The battery cell works mainly relying on the movement of metal ions between the positive electrode sheet and the negative electrode sheet. The positive electrode sheet includes a positive electrode current collector and a positive electrode active material layer. A surface of the positive electrode current collector is coated with the positive electrode active material layer. Current collectors not coated with the positive electrode active material layer protrude from the current collector coated with the positive electrode active material layer. The current collectors not coated with the positive electrode active material layer are stacked and serve as positive electrode tabs. Taking a lithium-ion battery as an example, the material of the positive current collector may be aluminum, and the positive active material may be lithium cobalt oxide, lithium iron phosphate, ternary lithium, lithium manganate, or the like. The negative electrode sheet includes a negative electrode current collector and a negative electrode active material layer. A surface of the negative electrode current collector is coated with the negative electrode active material layer. Current collectors not coated with the negative electrode active material layer protrude from the current collector coated with the negative electrode active material layer. The current collectors not coated with the negative electrode active material layer are stacked and serve as negative electrode tabs. The material of the negative electrode current collector may be copper, and the negative electrode active material may be carbon, silicon, or the like. The separator may be made of polypropylene (PP), polyethylene (PE), or the like. In addition, the electrode assembly may be of a wound structure or a laminated structure, which is not limited in the embodiments of the present application.

The applicant finds that in order to increase the battery capacity, usually a plurality of battery cells are stacked on each other to form a battery module, and the plurality of battery modules are then stacked on each other in a box body. A plurality of battery modules are usually glued or welded together through end plates of the battery modules. The battery cells will expand as the usage time increases, and the end plates will deform under the action of expansion forces of the battery cells, so that adjacent end plates are separated, the connections between the battery modules fail, and the battery modules with failed connections are prone to displacement under the action of an external force, thereby causing potential safety hazards.

The battery cell disclosed in the embodiments of the present application can be used, but not limited to, in electrical apparatus such as a vehicle, a ship, or an aircraft. The battery cells, batteries, and the like disclosed in the present application may be used to constitute a power source system of the electrical apparatus, which can avoid the expansion forces of the battery cells from causing connection failure between the battery modules, thereby improving the safety of the battery.

Examples of the present application provide an electrical apparatus that uses a battery as a power source, and the electrical apparatus may be, but is not limited to, a mobile phone, a tablet, a laptop, an electric toy, an electric tool, a battery vehicle, an electric vehicle, a ship, a spacecraft, and so on. The electric toy may include fixed or mobile electric toys, such as game consoles, electric car toys, electric ship toys, electric airplane toys, and the like. The spacecraft may include airplanes, rockets, space shuttles, spaceships, and the like.

For the convenience of description, the following embodiments are illustrated with an example in which the electrical apparatus according to an embodiment of the present application is a vehicle 1000.

Figure 1:
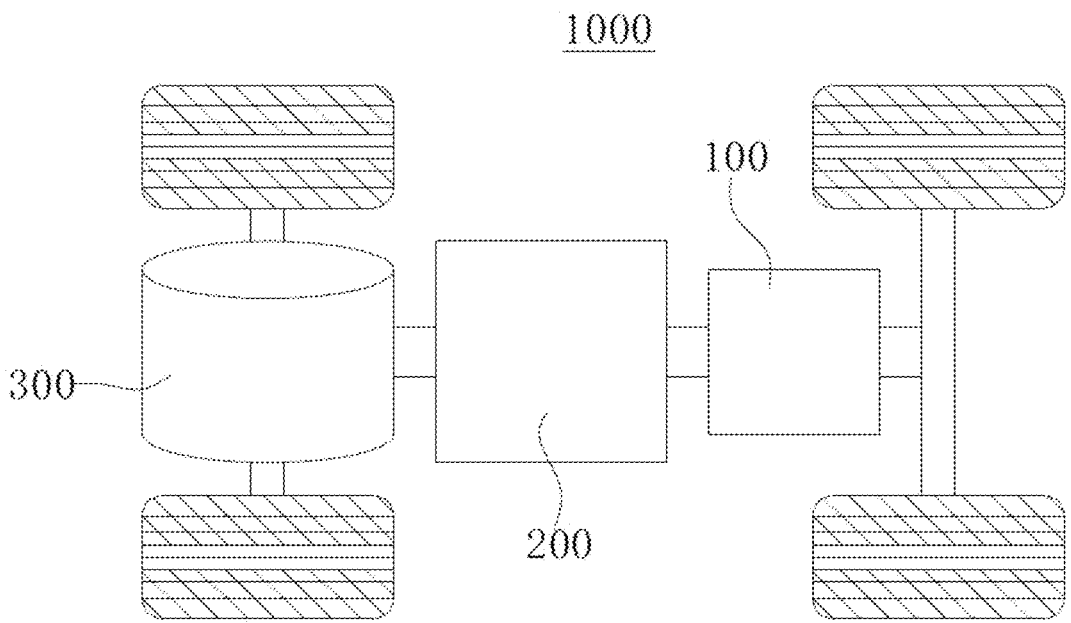
FIG. 1 is a schematic structural diagram of a vehicle according to some embodiments of the present application.

Referring to FIG. 1, FIG. 1 is a schematic structural diagram of a vehicle according to some embodiments of the present application. The vehicle 1000 may be a fuel vehicle, a gas vehicle, or a new-energy vehicle, and the new-energy vehicle may be an all-electric vehicle, a hybrid electric vehicle, an extended range electric vehicle, or the like. The interior of the vehicle 1000 is provided with a battery 100, and the battery 100 may be arranged at the bottom or head or tail of the vehicle 1000. The battery 100 may be used to power the vehicle 1000. For example, the battery 100 may be used as an operating power source of the vehicle 1000. The vehicle 1000 may further include a controller 200 and a motor 300. The controller 200 is used for controlling the battery 100 to power the motor 300, for example, for meeting the operating power demand when the vehicle 1000 is starting, navigating, and driving.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
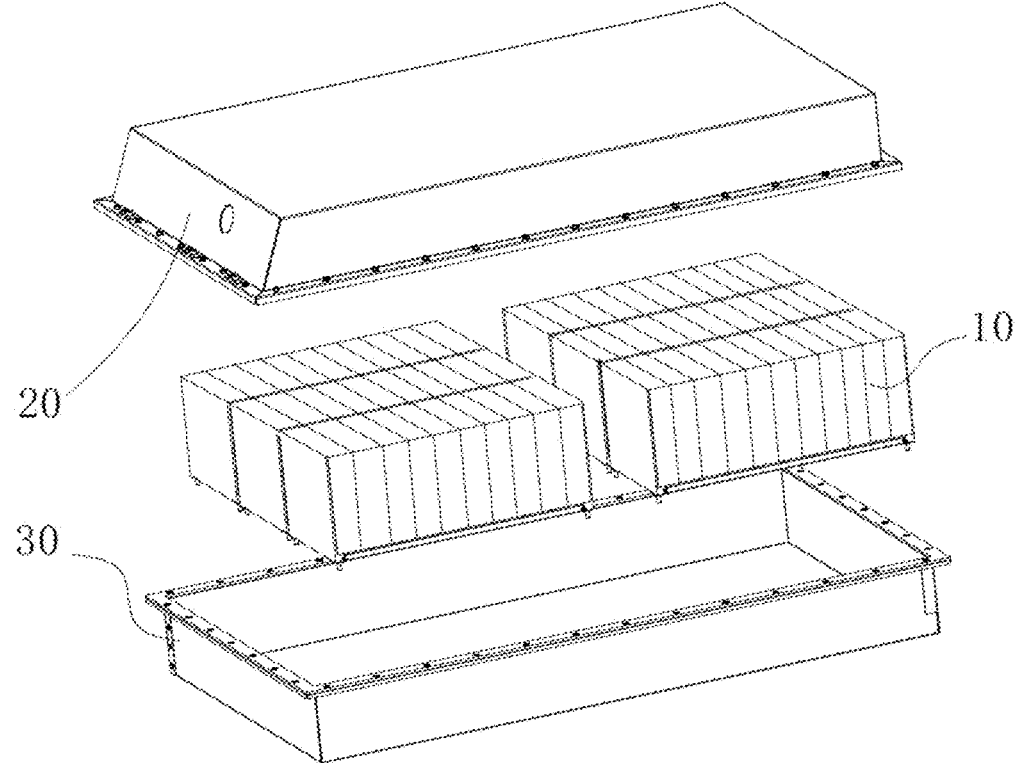
FIG. 2 is a schematic exploded structural diagram of a battery according to some embodiments of the present application.

Referring to FIG. 2, FIG. 2 is a schematic exploded structural diagram of a battery according to some embodiments of the present application. The battery 100 includes a box body and battery cells (not shown). In some embodiments, the box body may include an upper cover 20 and a lower cover 30, the upper cover 20 and the lower cover 30 cover each other. The upper cover 20 and the lower cover 30 together define an accommodating space for accommodating the battery cells. The lower cover 30 may be a hollow structure with an open end, and the upper cover 20 may be a plate-shaped structure. The upper cover 20 covers the opening side of the lower cover 30, so that the upper cover 20 and the lower cover 30 jointly define an accommodating space. The upper cover 20 and the lower cover 30 may also be hollow structures with one side opening, and the opening side of the upper cover 20 covers the opening side of the lower cover 30. Of course, the box body formed by the upper cover 20 and the lower cover 30 may be of various shapes, such as a cylinder or a cuboid.

In the battery 100, there may be a plurality of battery cells, and the plurality of battery cells may be in series or parallel or parallel-series connection, wherein the parallel-series connection means that the plurality of battery cells are connected in both series and parallel. The plurality of battery cells may be directly in series or parallel or parallel-series connection together, and then the whole composed of the plurality of battery cells may be accommodated in the box body. Of course, for the battery 100, a plurality of battery cells may also be first in series or parallel or parallel-series connection to form a battery module 10, and a plurality of battery modules 10 are then in series or parallel or parallel-series connection to form a whole and accommodated in the box body. The battery 100 may further include other structures, for example, the battery 100 may further include a convergence component (not shown) for electrically connecting the plurality of battery cells.

Each battery cell may be a secondary battery cell or a primary battery cell; or may be a lithium-sulfur battery cell, a sodium-ion battery cell or a magnesium-ion battery cell, but is not limited thereto. The battery cells may be cylindrical, flat, cuboid, or in other shapes.

Figure 3:
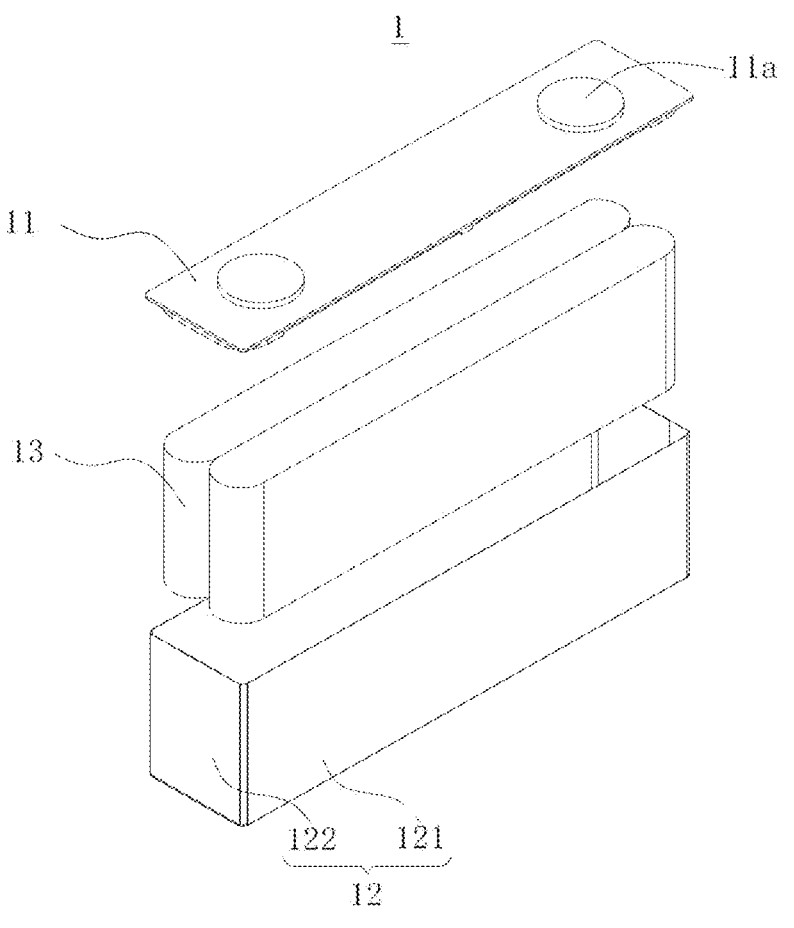
FIG. 3 is a schematic exploded structural diagram of a battery cell according to some embodiments of the present application.

Referring to FIG. 3, FIG. 3 is a schematic exploded structural diagram of a battery cell according to some embodiments of the present application. A battery cell 1 refers to the smallest unit that forms the battery. As shown in FIG. 3, the battery cell 1 includes an end cover 11, a shell 12, an electrode assembly 13, and other functional components.

The end cover 11 refers to a component that covers the opening of the shell 12 to isolate the internal environment of the battery cell 1 from the external environment. Without limitation, the shape of the end cover 11 can match with the shape of the shell 12 to fit the shell 12. Optionally, the end cover 11 may be made of a material with a certain hardness and strength (such as aluminum alloy). In this way, the end cover 11 is not easily deformed when it is squeezed and collided, so that the battery cell 1 is capable of having a higher structural strength, and the safety performance can also be improved. The end cover 11 may be provided with a functional component such as an electrode terminal 11*a*. The electrode terminal 11*a* may be used for electrically connecting to the electrode assembly 13, for outputting or inputting electric energy of the battery cell 1. In some embodiments, the end cover 11 may further be provided with a pressure relief mechanism configured to relieve an internal pressure when the internal pressure or temperature of the battery cell 1 reaches a threshold. The end cover 11 may be made of various materials, such as copper, iron, aluminum, stainless steel, aluminum alloy, and plastic, which is not particularly limited in the embodiments of the present application. In some embodiments, an insulating member may be arranged at an inner side of the end cover 11, and the insulating member may be used for isolating an electrical connecting component in the shell 12 from the end cover 11 to reduce the risk of short circuit. Exemplarily, the insulating member may be plastic, rubber, or the like.

The shell 12 is a component used for fitting the end cover 11 to form the internal environment of the battery cell 1, wherein the formed internal environment may be used for accommodating the electrode assembly 13, the electrolyte solution, and other components. The shell 12 and the end cover 11 may be independent components, and an opening may be arranged on the shell 12. The internal environment of the battery cell 1 is formed by covering the opening with the end cover 11 at the opening. Without limitation, the end cover 11 and the shell 12 may also be integrated. Specifically, the end cover 11 and the shell 12 may form a common connection surface before other components are placed into the shell. When the interior of the shell 12 needs to be encapsulated, the end cover 11 then covers the shell 12. The shell 12 may be in various shapes and sizes, such as cuboid, cylinder, and hexagonal prism. The shape of the shell 12 may be determined according to the specific shape and size magnitude of the electrode assembly 13. The shell 12 may be made of various materials, such as copper, iron, aluminum, stainless steel, aluminum alloy, and plastic, which is not particularly limited in the embodiments of the present application.

The electrode assembly 13 is a component in which an electrochemical reaction occurs in the battery cell 1. One or more electrode assemblies 13 may be included in the shell 12. The electrode assembly 13 is mainly formed by winding or stacking a positive electrode sheet and a negative electrode sheet, and a separator is usually provided between the positive electrode sheet and the negative electrode sheet. Parts of the positive electrode sheet and the negative electrode sheet with the active material constitute the main body of the electrode assembly 13, and parts of the positive electrode sheet and the negative electrode sheet without the active material respectively constitute tabs. The positive tab and the negative tab may be located at one end of the main body together or respectively located at two ends of the main body. During the charging and discharging of the battery, the positive electrode active material and the negative electrode active material react with the electrolyte solution, and the tabs are connected to the electrode terminal 11*a* to form a current loop.

According to some embodiments of the present application, refer to FIG. 3 to FIG. 7 together. The present application provides a battery 100, and the battery 100 includes a plurality of battery modules 10 arranged in sequence in a first direction X. The battery module 10 includes battery cells 1 and side plates 2 arranged on both sides of the battery cells 1 in the first direction X. The side plates 2 of two adjacent battery modules 10 are connected to each other, and in the two connected side plates 2, one side plate 2 is provided with clamping protrusions 21, and the other side plate 2 has clamping grooves 22. The clamping protrusions 21 are clamped into the clamping grooves 22 to limit their movement in a second direction, and the second direction is perpendicular to the first direction X.

The side plate 2 cooperates with other plates or brackets in the battery 100 so that positions of the side plate 2 and the battery cells 1 are relatively fixed. In an embodiment, the battery module 10 further includes end plates 3 arranged oppositely, and the two end plates 3 and the two side plates 2 are connected end-to-end in sequence to form a frame structure surrounding a plurality of battery cells 1. In the present embodiment, the battery 100 at least includes two battery modules 10, and the side plates 2 of two adjacent battery modules 10 are clamped with each other, so that the battery modules 10 are sequentially connected in the first direction X. The battery cell 1 includes an end cover 11 and a shell 12, the end cover 11 is provided with an electrode terminal 11*a*, the shell 12 includes a bottom surface arranged opposite to the end cover 11, first sides 121 arranged oppositely, and second sides 122 arranged oppositely. The area of the first side 121 may be larger than that of the second side 122, and the first sides 121 between adjacent battery cells 1 are arranged oppositely. The side plate 2 and the second side 122 are arranged oppositely. For example, in the embodiment shown in FIG. 4, a plurality of battery cells 1 are arranged in sequence in a width direction of the battery cell 1, the first direction X is a length direction of the battery cell 1, and the side plate 2 and the second sides 122 are arranged oppositely in the first direction X, so that the side plates 2 can limit the movement of the battery cells 1 in the first direction X.

The side plate 2 is prepared by a material with a certain strength, so that the side plate 2 can protect the battery cells 1 from being easily deformed when it is squeezed and collided, so that the battery cells 1 are capable of having a higher structural strength, and the safety performance may also be increased. In order to ensure that all the battery cells 1 in the battery module 10 can be protected by the side plate 2, the length of the side plate 2 in the length direction of the battery module 10 may be increased according to the number of battery cells 1 in the battery module 10, and the width of the side plate 2 matches well with the height of the battery cells 1, so that the side plate 2 can cover the second side surfaces 122 of all the battery cells 1 in the battery module 10. Optionally, the side plate 2 is integrally formed. In the connected side plates 2, one side plate 2 includes a flat plate-shaped main body part 23 and clamping protrusions 21 protruding from the main body part 23, and the other side plate 2 includes a flat plate-shaped main body part 23 and clamping grooves 22 formed by recessing from the main body part 23.

There are a plurality of directions perpendicular to the first direction X, and the present embodiment does not limit which specific direction perpendicular to the first direction X is the second direction. Taking the embodiment shown in FIG. 4 as an example, the second direction may be a thickness direction of the battery cell 1, that is, a direction shown by a Y axis in the figure; the second direction may also be a height direction from the end cover 11 to the bottom surface, that is, a direction shown by a Z axis in the figure. Of course, the second direction may also be a direction perpendicular to the first direction X other than the Y axis or the Z axis, and the clamping grooves 22 and the clamping protrusions 21 with different structures can limit the movement of adjacent battery modules 10 in one or a plurality of directions. For the convenience of description, two adjacent side plates 2A and 2B are taken as an example below to illustrate how the clamping grooves 22 and the clamping protrusions 21 having different structures limit the movement of the adjacent battery modules 10 in the second direction.

Figure 5:
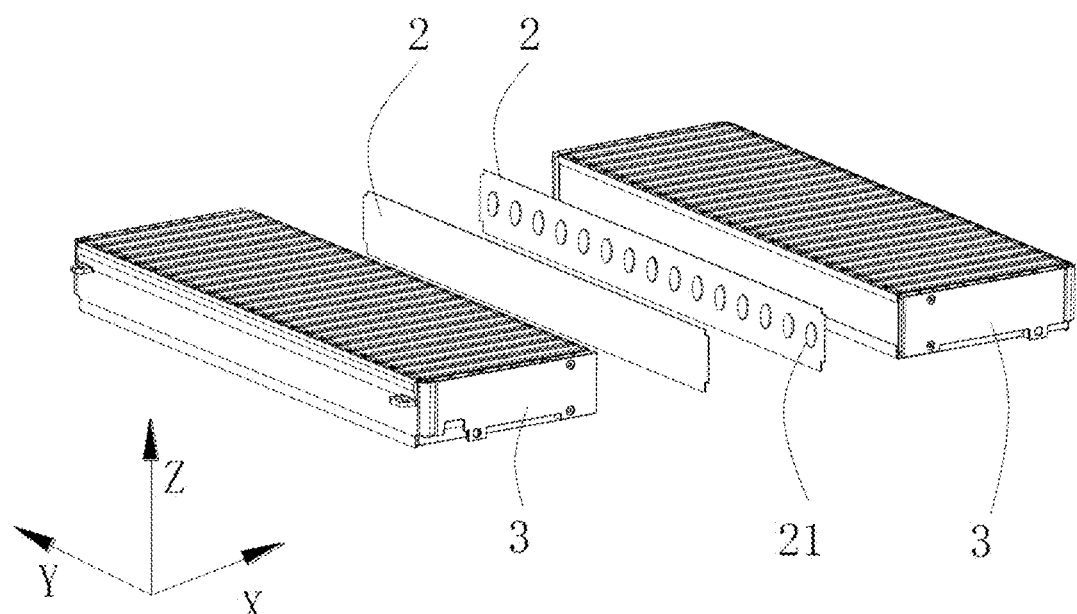
FIG. 5 is a schematic disassembled structural diagram of a battery according to some embodiments of the present application.

In one embodiment, referring to FIG. 5, the side plate 2A is provided with clamping protrusions 21, the clamping protrusion 21 is a cylinder protruding in the first direction X, and the side plate 2B is recessed in the first direction X to form cylindrical clamping grooves 22 that fit the clamping protrusions 21. When the side plate 2A and the side plate 2B are assembled, the clamping protrusions 21 are inserted into the clamping grooves 22 in the first direction X, and a peripheral side of the clamping protrusion 21 is limited by an inner wall surface of the clamping groove 22, so that the movement of the side plate 2A and the side plate 2B in any direction perpendicular to the first direction X is limited by the clamping protrusions 21 and the clamping grooves 22.

Figure 6:
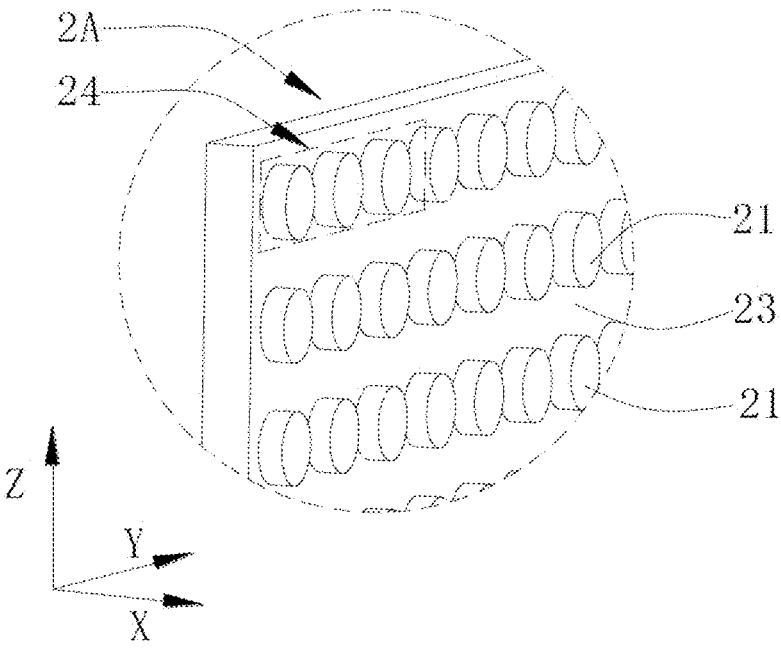
FIG. 6 is a schematic partial three-dimensional structural diagram of a side plate according to some embodiments of the present application.
Figures 7, 8, 9:
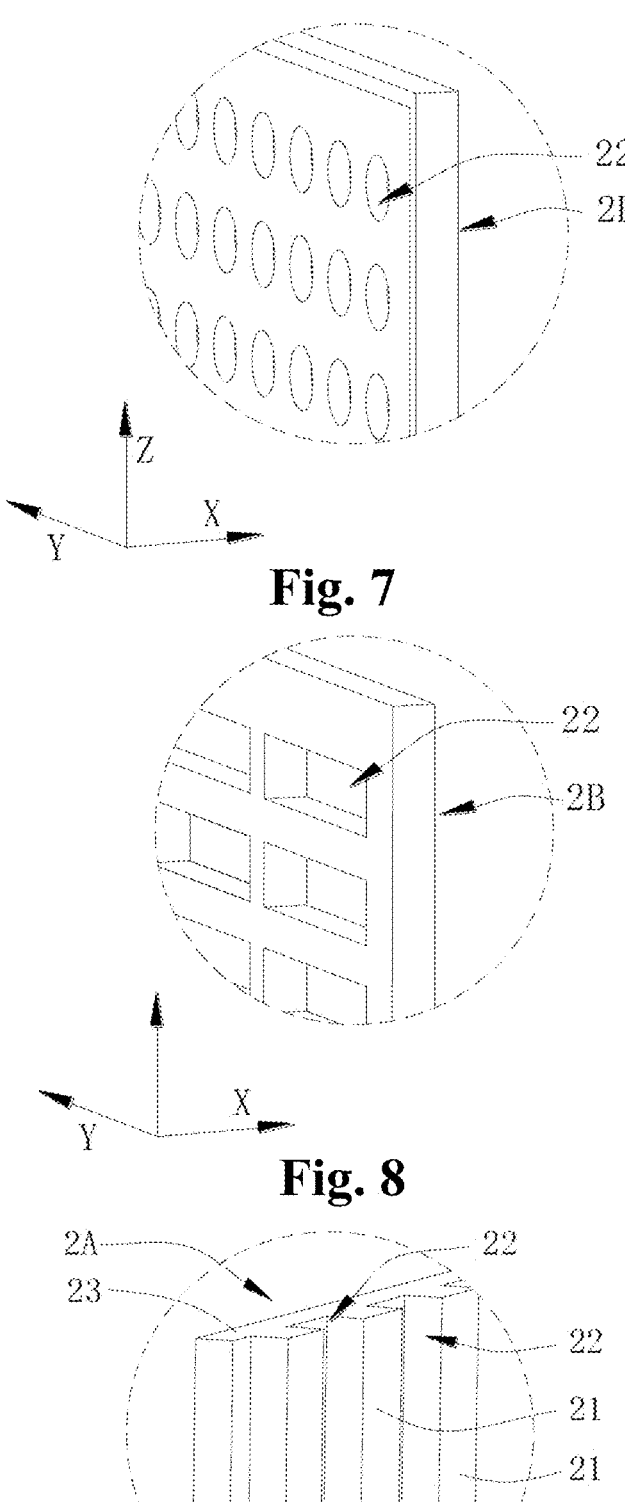
FIG. 7 is a schematic partial three-dimensional structural diagram of a side plate according to other embodiments of the present application.
FIG. 8 is a schematic partial three-dimensional structural diagram of a side plate according to yet other embodiments of the present application.
FIG. 9 is a schematic partial three-dimensional structural diagram of a side plate according to still other embodiments of the present application.
Figure 13:
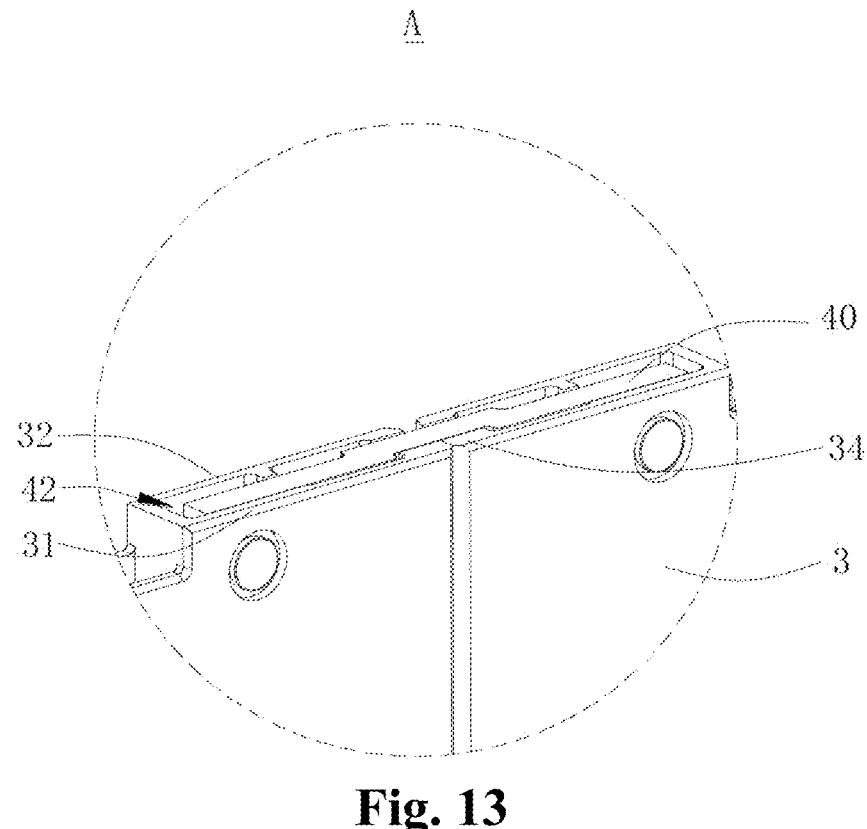
FIG. 13 is a schematic enlarged structural diagram of a part A shown in FIG. 12.

Referring to FIG. 6 and FIG. 8, in another embodiment, a plurality of clamping protrusions 21 are arranged on the side plate 2A, the clamping protrusions 21 are arranged to protrude in the first direction X, and the plurality of clamping protrusions 21 are arranged to form a connecting component 24, and the side plate 2B is recessed in the first direction X to form clamping grooves 22 fitting the connecting component 24. When the side plate 2A and the side plate 2B are assembled, the connecting component 24 is inserted into the clamping groove 22 in the first direction X, and an outer peripheral side of the connecting component 24 is limited by an inner wall surface of the clamping groove 22, that is, at least two clamping protrusions 21 in the connecting component 24 are in contact with the inner wall surface of the clamping groove 22, so that the side plate 2A and the side plate 2B are limited by both the clamping protrusions 21 and the clamping groove 22 in a plurality of directions perpendicular to the first direction X.

Referring to FIG. 9, in yet another embodiment, the side plate 2A is provided with clamping protrusions 21, the clamping protrusions 21 are strip-shaped structures protruding in the first direction X, and the side plate 2B is recessed to form clamping grooves 22 that fit the clamping protrusions 21. When the side plates 2A and 2B are assembled, the clamping protrusions 21 are inserted into the clamping grooves 22 in the first direction X, and both sides of the clamping protrusion 21 in the width direction are limited by an inner wall surface of the clamping groove 22, so that the movement of the side plates 2A and 2B in an extending direction perpendicular to the strip-shaped clamping protrusions 21 is limited by the clamping protrusions 21 and the clamping grooves 22.

Referring to FIG. 10, in still another embodiment, the side plate 2A is provided with clamping protrusions 21, and the clamping protrusions 21 are protruding strip-shaped structures. The clamping protrusion 21 includes an extending portion 211 protruding from the side plate 2 in the first direction X and a cover body portion 212 extending outward from the extending portion 211 in the second direction. The side plate 2B is recessed to form clamping grooves 22 fitting the clamping protrusions 21, and opposite ends of the clamping grooves 22 have openings for the clamping protrusions 21 to insert. When the side plate 2A and the side plate 2B are assembled, the clamping protrusions 21 are inserted into the clamping grooves 22 through the opening in the extending direction of the clamping grooves 22, so that the movement of the side plate 2A and the side plate 2B in the direction perpendicular to the extending direction of the clamping protrusions 21 and the movement in the first direction X are limited by the clamping protrusions 21 and the clamping grooves 22.

The structures of the clamping protrusions 21 and the clamping grooves 22 are diversified and will not be repeated here. It is understandable that it is only needed to ensure that the clamping protrusions 21 and the clamping grooves 22 can at least realize the limitation of relative displacement in the second direction perpendicular to the first direction X, so as to ensure that the adjacent battery modules 10 will not have relative displacement in the second direction.

In the present embodiment, by arranging the clamping grooves 22 and the clamping protrusions 21 on the side plates 2, the adjacent battery modules 10 can be clamped and connected through the clamping protrusions 21 and the clamping grooves 22 on the side plates 2, and the clamping protrusions 21 and the clamping grooves 22 that are clamped and connected limit the movement of the adjacent battery modules 10 in the second direction. Compared with the connection method of welding or bonding, even the side plates 2 in this embodiment is deformed under the action of an expansion force the battery cell 1, the clamping protrusions 21 and the clamping grooves 22 that are clamped and connected can also ensure the connection of the adjacent battery modules 10, thereby preventing relative displacement of the battery modules 10 after they are separated, and improving the safety of the battery 100.

Referring to FIG. 9 and FIG. 10 again, the side plates 2 connected to each other are both provided with a plurality of clamping protrusions 21, and clamping grooves 22 are defined between the clamping protrusions 21 arranged on the side plates 2. That is, a side plate 2 is provided with clamping protrusions 21 and clamping grooves 22 at the same time, and a plurality of clamping protrusions 21 are provided to increase a contact area between the connected side plates 2 and improve the stability of the connection of the adjacent battery modules 10.

Specifically, the clamping protrusions 21 may be arranged on the side plate 2 in the form of long strips at intervals in sequence, or may be arranged in an array on the side plate 2. Specifically, the long strip-shaped clamping protrusion 21 may be in the shape of a triangular prism, a cuboid, and the like, which is not limited in the present application. A cross-section of the clamping protrusions 21 arranged in an array in the second direction may specifically be a square, a pentagon, a hexagon, or the like.

Figure 4:
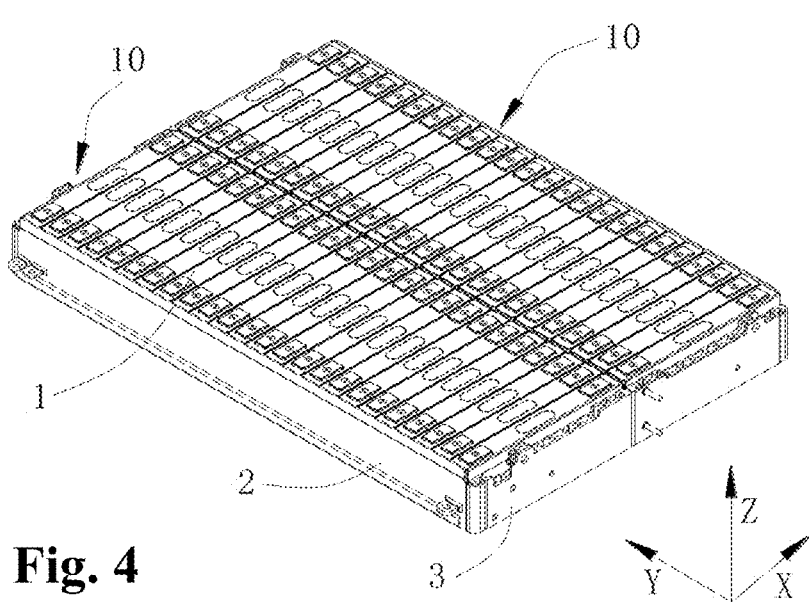
FIG. 4 is a schematic three-dimensional structural diagram of a battery according to some embodiments of the present application.

Referring to FIG. 4 and FIG. 11 together, in a plane where the side plate 2 is located, the plurality of clamping protrusions 21 of the side plate 2 extend at least in two different directions. Taking the embodiment shown in FIG. 11 as an example, a third direction Y is the width direction of the battery cell 1, a fourth direction Z is the height direction of the battery cell 1. The first direction X, the third direction Y, and the fourth direction Z are arranged to be perpendicular to one another. The side plate 2 is provided with a clamping protrusion 21 extending in the third direction Y, and is further provided with a clamping protrusion 21 extending in the fourth direction Z. After the clamping protrusions 21 are inserted into the clamping grooves 22 in the first direction X, the clamping protrusion 21 extending in the third direction Y may limit the relative displacement between the two side plates 2 in the fourth direction Z, and the clamping protrusion 21 extending in the fourth direction Z may limit the relative displacement between the two side plates 2 in the third direction Y. In some embodiments, more clamping protrusions 21 extending in different directions may be arranged on the side plate 2 as required, so as to increase the direction in which the connected side plates 2 are limited from displacement. It is understandable by those skilled in the art that the extending direction of the clamping protrusions 21 in the plane where the side plate 2 is located is not related to the direction in which the battery cells 1 are placed, that is, in some embodiments, all or part of the clamping protrusions 21 are arranged, in the extension direction of the plane where the side plate 2 is located, to intersect with the third direction Y or the fourth direction Z.

The clamping protrusions 21 extending in different directions can limit the movement of the adjacent battery modules 10 in different directions, thereby ensuring that the battery modules 10 will not be displaced in a plurality of directions.

The battery 100 further includes adhesive glue arranged between the two adjacent battery modules 10, and the side plates 2 of the two adjacent battery modules 10 are bonded by the adhesive glue.

Before assembling the two battery modules 10, the adhesive glue is first applied on the side plate 2, and then the clamping protrusions 21 are inserted into the clamping grooves 22, so that not only the side plates 2 realize the clamping connection through the clamping protrusions 21 and the clamping grooves 22, but also realize bonding through the adhesive glue, thereby improving the stability of the connection between the adjacent battery modules 10.

Referring to FIG. 4 and FIG. 12 to FIG. 15 together, the plurality of battery cells 1 of the battery module 10 are arranged side by side in the third direction Y, and the battery module 10 further includes end plates 3 arranged oppositely in the third direction Y. The end plates 3 and the side plates 2 are connected end-to-end and arranged around the plurality of battery cells 1. The battery 100 further includes connecting elements 40, and opposite ends of each connecting element 40 are respectively connected to the end plates 3 of two adjacent battery modules 10.

The end plates 3 and the side plates 2 may be connected end-to-end to surround the plurality of battery cells 1 arranged side by side in the third direction Y, for protecting the battery cells 1 from a plurality of directions. There may be a plurality of connecting elements 40 to increase the stability between adjacent end plates 3. In the embodiment shown in FIG. 14, two connecting elements 40 are respectively connected to opposite ends of the end plate 3. Not only the adjacent battery modules 10 are clamped and connected through the clamping protrusions 21 and clamping grooves 22 arranged on the side plates 2, but also adjacent end plates 3 are connected through the connecting element 40, thereby improving the stability of the connection between the adjacent battery modules 10.

The connecting element 40 and the various end plates 3 may specifically adopt one or a plurality of methods such as clamping connection, bolt connection, and welding. In some embodiments, for the connecting element 40 and the end plate 3 connected, one is provided with a connecting protrusion 41, the other is provided with a connecting groove 42 matching with the connecting protrusion 41, and the connecting element 40 and the end plate 3 realize the clamping connection by inserting the connecting protrusion 41 into the connecting groove 42. The connecting element 40 and the end plate 3 are clamped and connected by the connecting protrusion 41 and the connecting groove 42, which facilitates assembly of the connecting element 40 and the end plate 3.

In some embodiments, referring to FIG. 15, the end plate 3 has a connecting groove 42, the connecting element 40 includes a first connecting portion 43 and connecting protrusions 41 connected to opposite sides of the first connecting portion 43, the connecting protrusions 41 are inserted into the connecting grooves 42, and the end plates 3 are connected to the connecting protrusions 41 by bolts. During assembling, the positioning of the connecting element 40 and the end plate 3 may be realized through the connecting groove 42 and the connecting protrusion 41, so as to facilitate subsequent assembling of bolts. The end plate 3 and the connecting element 40 not only realize the clamping connection through the connecting groove 42 and the connecting protrusion 41, but also perform the bolt connection through the connecting protrusion 41, thereby improving the connection strength between the end plate 3 and the connecting element 40.

The end plate 3 includes a first side wall 31 and a second side wall 32 that are arranged oppositely at an interval in the third direction Y, the connecting groove 42 is formed between the first side wall 31 and the second side wall 32, and the connecting protrusion 41 abuts against the first side wall 31 and the second side wall 32. The end plate 3 further includes a plurality of supporting ribs 33 supported between the first side wall 31 and the second side wall 32 to increase the structural strength of the end plate 3. During the production of the battery 100, the battery modules 10 are assembled first, and then the battery modules 10 are connected together. In one embodiment, the second side wall 32 is used for abutting against the battery cells 1, so the end plate 3 is assembled to the battery cells 1 first, so that the second side wall 32 of the end plate 3 abuts against the battery cells 1. In this case, the assembling method of inserting the bolt into the first side wall 31 from the side of the first side wall 31 away from the second side wall 32 is easier to operate. Therefore, the connecting protrusion 41 is abutted between the first side wall 31 and the second side wall 32, so that the bolt inserted into the first side wall 31 from the outside of the end plate 3 can effectively fasten the first side wall 31 and the connecting protrusion 41.

A blind hole matching with the bolt may be arranged on the connecting protrusion 41, so that the second side wall 32 does not contact the bolt, thereby avoiding the bolt from damaging the battery cells 1 abutting against the second side wall 32. A blind hole matching with the bolt may further be arranged on the second side wall 32, so that the bolt can fasten the first side wall 31, the connecting protrusion 41, and the second side wall 32 at the same time, and ensure that the bolt does not abut against the battery cells 1. Of course, a through hole may also be arranged on the second side wall 32, and a bolt of appropriate length may be selected so that the bolt will not damage the battery cells 1 abutting against the second side wall 32.

In one embodiment, the end plate 3 further includes a limiting protrusion 34 protruding from the first side wall 31 to the second side wall 32, and the first connecting portion 43 has a limiting groove 44 fitting the limiting protrusion 34. Not only the clamping connection between the end plate 3 and the connecting element 40 is realized through the connecting groove 42 and the connecting protrusion 41, but also relative position limiting is realized through the limiting protrusion 34 and the limiting groove 44.

Referring to FIG. 4, FIG. 16, and FIG. 17, in another embodiment, the connecting element 40 includes a second connecting portion 45 and a first fixing portion 46 connected to opposite sides of the second connecting portion 45, the second connecting portion 45 has a connecting groove 42, connecting protrusions 41 of adjacent end plates 3 are inserted into the connecting grooves 42, the two first fixing portions 46 are arranged opposite to the connecting protrusions 41 of the adjacent end plates 3 in the third direction Y, and the first fixing portions 46 are connected to the connecting protrusions 41 by bolts.

The connecting protrusion 41 may be inserted into the connecting groove 42 in advance to realize the positioning of the connecting element 40 and the end plate 3, and then the first fixing portion 46 and the connecting protrusion 41 may be fastened by bolts. The connecting element 40 and the end plate 3 are also connected through two connecting methods, on the one hand, clamping connection is realized through the connecting protrusion 41 and the connecting groove 42, and on the other hand, the first fixing portion 46 and the connecting protrusion 41 are connected by bolts, so as to improve the stability of the connection between the end plate 3 and the connecting element 40.

In order to ensure that an outer surface of the connecting element 40 is flat after being connected to the end plate 3, the end plate 3 further includes at least one supporting step 36 arranged on a peripheral side of the connecting protrusion 41. The connecting element 40 is placed on the supporting step 36, and an outer surface of the first fixing portion 46 away from the connecting protrusion 41 and an outer surface of the first side wall 31 are on the same plane.

Referring to FIG. 4 and FIG. 18 to FIG. 20, in yet another embodiment, the connecting element 40 includes a first connecting plate 47, second connecting plates 48 bent and extended from opposite ends of the first connecting plate 47, and second fixing portions 49 bent and extended from the second connecting plates 48. The first connecting plate 47 and the two second connecting plates 48 form the connecting groove 42, the connecting protrusions 41 of two adjacent end plates 3 are clamped in the connecting groove 42 together, and the second fixing portions 49 are connected to the end plates 3 by bolts.

The first connecting plate 47 is arranged to extend in the first direction X, the two second connecting plates 48 may be arranged to extend from opposite ends of the first connecting plate 47 in the fourth direction Z, and the second fixing portion 49 may be arranged to extend from the end of the second connecting plate 48 away from the first connecting plate 47 in the first direction X. Wall surfaces of the two second connecting plates 48 close to each other are in contact with the connecting protrusions 41 of the two adjacent end plates 3 respectively. In other words, the length of the first connecting plate 47 matches with the length of the connecting protrusions 41 of the adjacent end plates 3 in the first direction X. For example, the length of the first connecting plate 47 in the embodiment shown in FIG. 19 is greater than the length of the first connecting plate 47 in the embodiment shown in FIG. 18. Mounting holes extending in the fourth direction Z are arranged on the second fixing portion 49 so that bolts may be inserted into the second fixing portion 49 in the fourth direction Z, and no mounting holes are left on the surface of the end plate 3 away from the battery cells 1. Similarly, in order to prevent the connecting element 40 from interfering with the arrangement of other parts, the end plate 3 includes a first side wall 31 and a second side wall 32 arranged oppositely, and the connecting element 40 is partially or completely received between the first side wall 31 and the second side wall 32. The end plate 3 further includes a mounting plate 35 connecting the first side wall 31 and the second side wall 32, and the second fixing portion 49 is connected to the mounting plate 35 by bolts.

In this embodiment, on the one hand, the end plate 3 and the connecting element 40 are clamped and connected through the connecting protrusion 41 and the connecting groove 42, and on the other hand, through the bolt connection of the second fixing portions 49, the stability of the connection between the end plate 3 and the connecting element 40 is improved.

Referring to FIG. 4, FIG. 21, and FIG. 22, in still another embodiment, the connecting element 40 includes a first sub-element 51 and a second sub-element 52, the first sub-element 51 includes a bending portion 511 and two penetrating portions 512 arranged oppositely. The end plate 3 has a receiving groove 37 communicated in the fourth direction Z, the two penetrating portions 512 are connected to the bending portion 511 at one end, and respectively pass through the receiving grooves 37 of the adjacent end plates 3 and are connected to the second sub-element 52 by bolts at the other end.

The first sub-element 51 and the second sub-element 52 are detachably connected, and the bending portion 511 and the two penetrating portions 512 may be integrally formed. The second sub-element 52 includes a connecting piece 521 provided with a mounting hole, and a fastener 522 in threaded connection with the penetrating portion 512. During assembling, the end of the penetrating portion 512 away from the bending portion 511 is inserted into and passes through the receiving groove 37, and the two receiving grooves 37 limit the movement of the connecting element 40 in the first direction X. The penetrating portion 512 passes through the receiving groove 37 and then passes through the mounting hole arranged on the connecting piece 521, and the fasteners 522 are respectively in threaded connection with the two penetrating portions 512. The connecting piece 521 and the bending portion 511 are arranged oppositely to limit the movement of the connecting element 40 in the fourth direction Z. The relative positions of the connecting element 40 and the end plate 3 may be fixed without setting the mounting hole extending in the third direction Y on the end plate 3, thereby avoiding opening a mounting hole on the end plate 3, so that the end plate 3 has higher strength.

The end plate 3 further includes a receiving cavity 38 in communication with the receiving groove 37, the bending portion 511 is received in the receiving cavity 38, and an end of the bending portion 511 close to the second sub-element 52 abuts against a wall surface of the receiving cavity 38.

The two penetrating portions 512 and the bending portion 511 may form a U-shaped structure, and the receiving cavity 38 has a wall surface matching with the curvature of the bending portion 511 to increase the abutting area of the bending portion 511 and the receiving cavity 38. The receiving cavity 38 is arranged to receive the bending portion 511, so as to prevent the bending portion 511 from interfering with arrangement of other components in the battery 100, and improve the compactness of the layout of the battery 100.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various examples can be combined in any manner as long as there is no structural conflict. The present application is not limited to the specific embodiments disclosed herein, but rather includes all technical solutions falling within the scope of the claims.

What is claimed is:

1. A battery comprising:

a plurality of battery modules arranged in sequence in a first direction; and connecting elements;

wherein:

each battery module comprises battery cells and side plates arranged on both sides of the battery cells in the first direction;

the side plates of two adjacent battery modules are configured to be connected to each other, in the two connected side plates, one side plate is provided with clamping protrusions, the other side plate has clamping grooves, and the clamping protrusions are configured to be clamped into the clamping grooves to prevent each other from moving in a second direction, the second direction being perpendicular to the first direction;

a plurality of battery cells of the battery module are configured to be arranged side by side in a third direction, and the battery module further comprises end plates configured to be arranged oppositely in the third direction, and the end plates and the side plates are configured to be connected end-to-end and arranged around the plurality of battery cells, the first direction being perpendicular to the third direction; and opposite ends of each connecting element are respectively configured to be connected to the end plates of the two adjacent battery modules, so as to limit the relative displacement of the adjacent end plates;

for the connecting element and the end plates connected, one is provided with a connecting protrusion, and the other is provided with a connecting groove matching with the connecting protrusion;

the end plate is configured to be provided with the connecting groove, the connecting element comprises a first connecting portion and the connecting protrusions configured to be connected to opposite sides of the first connecting portion, the connecting protrusions are configured to be inserted into the connecting grooves, and the end plates are configured to be connected to the connecting protrusions by bolts;

the end plate comprises a first side wall and a second side wall that are arranged oppositely at an interval in the third direction, the connecting groove is formed between the first side wall and the second side wall, and the connecting protrusion abuts against the first side wall and the second side wall; and the end plate further comprises a limiting protrusion protruding from the first side wall to the second side wall, and the connecting portion has a limiting groove fitting the limiting protrusion.

2. The battery according to claim 1, wherein the connected side plates are each provided with a plurality of clamping protrusions, and the clamping grooves are formed between the clamping protrusions on the side plate.

3. The battery according to claim 2, wherein in a plane where the side plate is located, the plurality of clamping protrusions of the side plate extend at least in two different directions.

4. The battery according to claim 1, further comprising:

adhesive glue arranged between the two adjacent battery modules, and the side plates of the two adjacent battery modules are bonded by the adhesive glue.

5. The battery according to claim 1, wherein the connecting element comprises a second connecting portion and first fixing portions configured to be connected to opposite sides of the second connecting portion, the second connecting portion has connecting grooves, connecting protrusions of adjacent end plates are configured to be inserted into the connecting grooves, the two first fixing portions are arranged opposite to the connecting protrusions of the adjacent end plates in the third direction, and the first fixing portions are configured to be connected to the connecting protrusions by bolts.

6. The battery according to claim 1, wherein the connecting element comprises a first connecting plate, second connecting plates configured to be bent and extend from opposite ends of the first connecting plate, and second fixing portions configured to be bent and extend from the second connecting plates, the first connecting plate and the two second connecting plates form a connecting groove, the connecting protrusions of the two adjacent end plates are configured to be clamped in the connecting groove together, and the second fixing portions are configured to be connected to the end plates by bolts.

7. The battery according to claim 1, wherein the connecting element comprises a first sub-element and a second sub-element, the first sub-element comprises a bending portion and two penetrating portions arranged oppositely, a receiving groove configured to be connected to the end plate in a fourth direction, the two penetrating portions are connected to the bending portion at one end, and respectively pass through the receiving grooves of the adjacent end plates and are connected to the second sub-element by bolts at the other end, the fourth direction being perpendicular to the third direction.

8. The battery according to claim 7, wherein the end plate further comprises a receiving cavity in communication with the receiving groove, the bending portion is received in the receiving cavity, and an end of the bending portion close to the second sub-element abuts against a wall surface of the receiving cavity.

9. An electrical apparatus, comprising the battery according to claim 1, wherein the battery is configured to provide electric energy.

* * * * *